March 23, 1926.

I. B. GRIMALDI

LIFE SAVING AUTOMOBILE FENDER

Filed July 21, 1925

1,577,904

INVENTOR
Ignatius Bone Grimaldi
BY
ATTORNEY

Patented Mar. 23, 1926.

1,577,904

UNITED STATES PATENT OFFICE.

IGNATIUS B. GRIMALDI, OF BROOKLYN, NEW YORK.

LIFE-SAVING AUTOMOBILE FENDER.

Application filed July 21, 1925. Serial No. 44,977.

*To all whom it may concern:*

Be it known that I, IGNATIUS B. GRIMALDI, a subject of the King of Italy, residing at Brooklyn, in the county of Kings and State of New York, have invented certain new and useful Improvements in Life-Saving Automobile Fenders, of which the following is a specification.

The present invention relates to improvements in fenders for automobiles and like vehicles, and it is the principal object of the invention to provide a fender which is ornamental and mechanically practical at the same time having substantially the shape of an eagle, the wings of which are foldable about an object in the path of the vehicle which has been gathered up by the tail of the eagle which is widened and travels on rollers or wheels in front of the car.

Another object of the invention is the provision of a tail piece for the eagle's body rolling along on wheels in front of the car, which can be elevated to pick up the obstruction and carry the same against the eagle's body.

A further object of the invention is the provision of a fender equipped with means for elevating the tail piece when meeting an obstruction in the road, and to press said object against the body, releasing the means holding the wings normally in their spread position to fold the same and embrace the obstruction.

These and other objects and advantages of my invention will become more fully apparent as the description thereof proceeds, and will then be more specifically defined in the appended claims.

In the accompanying drawing forming a material part of this disclosure:

Figure 1:
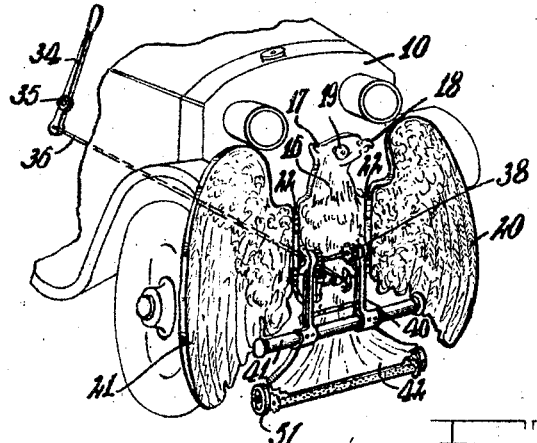
Figure 1 is a fragmentary perspective view of a fender constructed according to the present invention.
Figure 2:
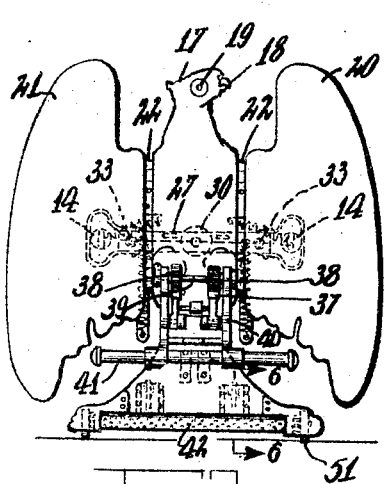
Fig. 2 is a front elevation of the fender proper.
Figures 3, 4:
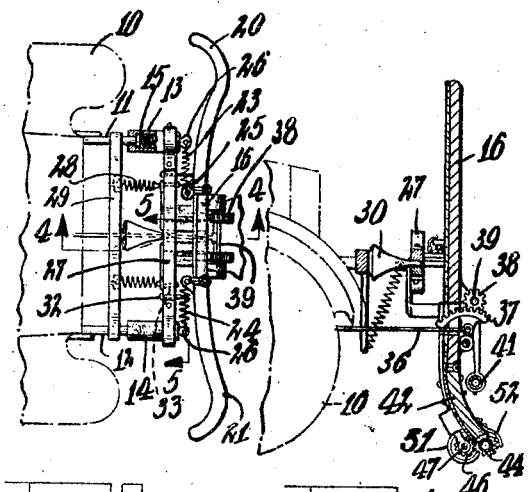
Fig. 3 is a top plan view of the fender.
Fig. 4 is a section on line 4—4 of Figure 3.
Figure 5:
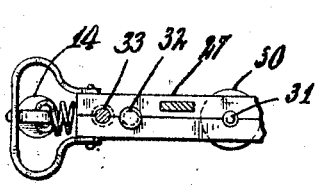
Fig. 5 is a front elevation of an operating bar seen in the direction of the arrows 5—5 of Figure 3.
Figure 6:
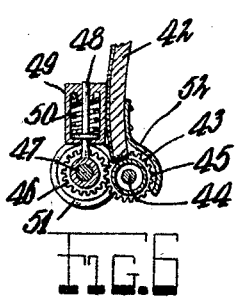
Fig. 6 is a section on line 6—6 of Figure 2.

To the front part of the automobile 10 a pair of parallel horizontal bars 11 and 12, are attached in any suitable manner, having their front ends located in stuffing boxes 13 and 14, in which springs 15 are arranged for cushioning these ends and which have the tendency to press the fender, the general outlines of which is similar to the representation of an eagle 16, towards the front.

This eagle has one head 17 having its bill 18 directed towards one side or may have a double head with the bills thereof directed in opposite directions. The head has an eye 19, or eyes, as the case may be, represented by a lamp illuminated from the light batteries of the car. The wings 20 and 21 are hingedly secured to the body, as at 22, and are normally held in their spread position by means of springs 23 and 24, attached at one end to movable eyes 25 on the wings and at their other ends, are attached to eyes 26, on a split bar 27, cushioned by springs 28 against a stationary bar 29 on the bars 11 and 12.

A cone 30 has its point 31 located between the parts of the split bar 27.

Rods 32 and 33, the latter under the action of springs 28, are movable in holes of bar 27 and are normally held therein while they come to action upon the splitting of said bar by the point of the cone when the fender is pressed inwardly by meeting an obstruction in the path of the car, and the operation of the lever 34 pivoted intermediate its ends, as at 35, to the lower end of which a bar 36 is attached for operating a pair of toothed segments 37 in mesh with gears 38 on a shaft 39 having also attached thereto the guides 40 for the operation of the tail piece bar 41. The tail piece 42 is hinged to the body, and has its lower end in engagement with cams 43 on shafts 44 which also carry gears 45 in mesh with gears 46 on shafts 47 cushioned by means of rods 48 entering stuffing boxes 49 and cushioned therein by means of springs 50. Shafts 47 carry also rollers 51 by means of which the tail piece is normally rolling on the road. The rollers 51 will at all times keep the tail 42 off the ground. A guard 52 protects gear 45. It will be clear that by making the head of rod 32 larger so that it will not pass through the split bar 27, the tail of the eagle may be made inoperative.

The device operates as follows:

If the tail pieces strikes an object or person in the path of the vehicle, and the lever 34 is pulled towards the operator, the segments and gears will act to elevate the object and press it against the fender, so that the same will split bar 27 and release the holding means thereof, so that the wings will be operated to embrace and hold the object.

It is to be understood that while I have described and shown the preferred form of my invention as an example, such changes may be made therein as fall within the scope of the appended claims, without departure from the spirit of the invention and the principle involved. Thus for instance, the representation of the eagle may be repeated on the sides, and a sound creating member may be provided within the body of the eagle to make it scream.

Having thus described my invention, what I claim as new, and desire to secure by Letters Patent, is:

1. A fender comprising a representation of an eagle, means for normally holding the wings of the eagle spread, a movable tail piece, means for trundling the tail piece over the ground, means for allowing an elevation of said tail piece when meeting an obstruction in the road to carry it against said wings for releasing the means holding said wings spread, for a closing of the wings over the obstruction picked up by the said tail piece.

2. A fender comprising the representation of an eagle, a split bar for normally holding the wings of the eagle spread, a movable tail piece, rollers for allowing a traveling of said tail piece over the ground, means for operating said tail piece for picking up an obstruction on the ground, to carry the same against said wings, means to split said bar upon the rearward movement of said wings by said obstruction and allowing a folding of the same over said obstruction.

3. A fender in form of the representation of an eagle, a body, a pair of wings hinged to said body, means for normally holding said wings spread, a movable tail piece, wheels for trundling said tail piece over the ground in front of the car, an operating lever, segments and gears operated by said lever to lift the tail piece for picking up an obstruction in the road, and carry the same against said body and its wings to move the same to the rear, and means operated by the rearward movement of said body to release said wing holding means for allowing a folding of said wings about the body or obstruction picked up by said tail piece.

4. A fender having substantially the form of an eagle comprising a body part and a head part, eyes in said head part represented by lamps, a pair of wings, a split bar, and means engaged in said bar for normally holding said wings spread, a movable tail piece, means for operating said tail piece to pick up an obstruction in the road, and carry the same against the wings, a means for releasing said wing spreading means upon the rearward movement of said body, and means for allowing a closing of the wings over the obstruction picked up by said tail piece.

5. A fender representing substantially an eagle, a body comprising a split bar, wings on said body, means co-operating with said split bar for normally holding said wings spread, a movable tail piece, means for operating said tail piece to pick up an obstruction in the road and for carrying the same against said body, and a cone adapted to split said bar upon the rearward movement of said body to release the wing holding means and allowing a folding of the same over the obstruction carried by said tail piece.

In testimony whereof I have affixed my signature.

IGNATIUS B. GRIMALDI.